April 23, 1940.                D. D. WILE                2,198,070
PRESSURE VALVE
Filed Aug. 9, 1938
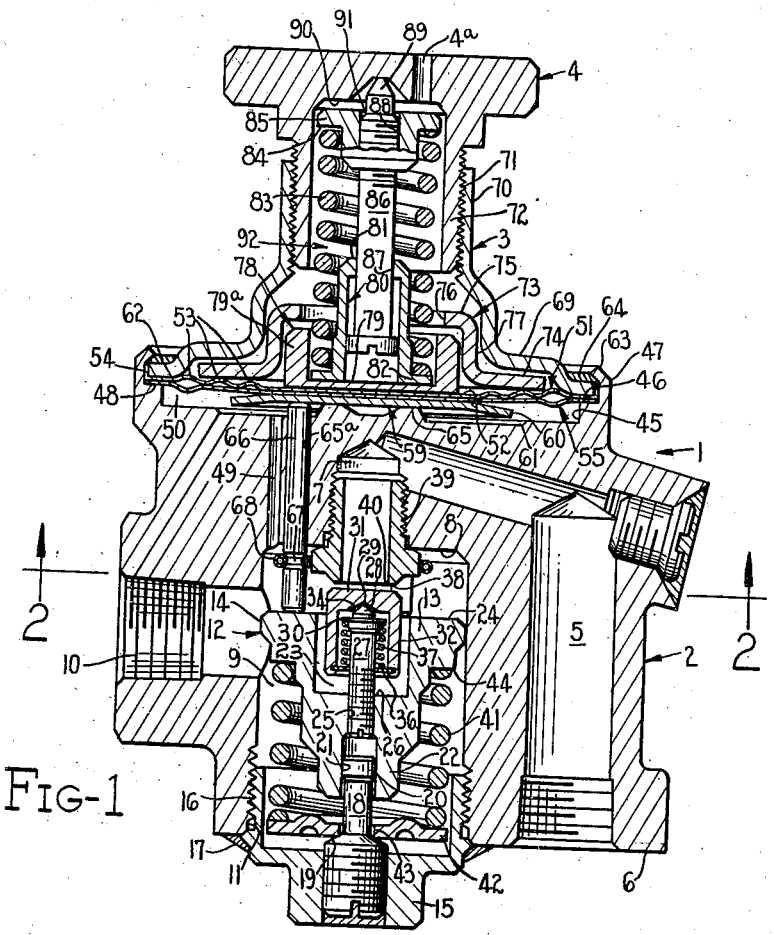
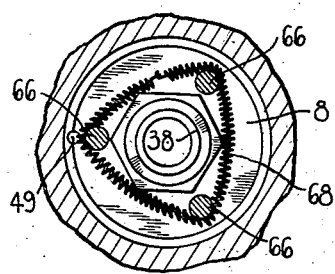
FIG.-1
FIG.-2
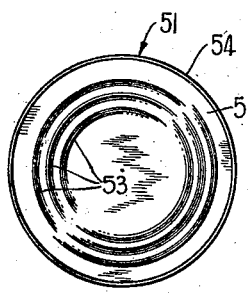
FIG.-3
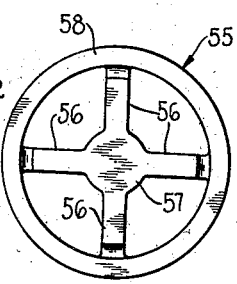
FIG.-4
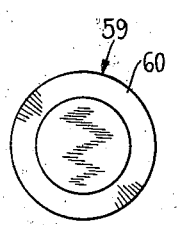
FIG.-5
INVENTOR
Daniel D. Wile
BY
Andrew K. Foulds
his ATTORNEY Patented Apr. 23, 1940

2,198,070

UNITED STATES PATENT OFFICE 2,198,070

PRESSURE VALVE

Daniel D. Wile, Utica, N. Y., assignor to Detroit Lubricator Company, Detroit, Mich., a corporation of Michigan Application August 9, 1938, Serial No. 223,889

11 Claims. (Cl. 50—23)

My invention relates generally to new and useful improvements in pressure operated valves and more particularly to valves for regulating the pressure of a fluid discharging therethrough, which fluid may be water or other fluid and be supplied for example to a spray nozzle or other restricted orifice.

An object of my invention is to provide a valve which is operable to maintain substantially constant the delivery pressure of a fluid.

Another object is to provide means to limit the minimum pressure to be maintained by the valve.

Another object is to provide means for adjusting the valve to regulate the pressure which is to be maintained above the minimum pressure.

Another object is to provide a valve structure having a valve member automatically adjustable for cooperative engagement with its seat.

Another object is to provide means for preventing rupture of a diaphragm or other pressure responsive member for controlling operation of the valve.

The invention consists in the improved construction and combination of parts comprising my novel valve, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view in central vertical crosssection of a valve embodying my invention;

Fig. 2 is a view along the line 2—2 of Fig. 1, taken in the direction of the arrows;

Fig. 3 is a view on a reduced scale of a diaphragm member forming part of the valve of Fig. 1;

Fig. 4 is a view on a reduced scale of a diaphragm backing member, and

Fig. 5 is a view on a reduced scale of an abutment member cooperable with the diaphragm member.

Referring to the drawing by characters of reference, the numeral 1 designates generally a pressure regulating valve having a body member or casing 2, a cap member 3, and an adjusting cap 4 having an aperture 4ª through the top wall thereof. An L-shaped inlet passageway 5 has one leg opening upwardly into the body member 2 through the bottom casing wall 6, and has its inlet end connected to a suitable source of fluid supply (not shown). The other passageway leg extends substantially horizontally and terminates in a vertical passageway 7 extending downward and opening through the substantially horizontal top wall 8 of a cylindrical chamber 9 located within the body member 2. The chamber 9 has an outlet passageway 10 which may be connected to suitable equipment such as a spray nozzle (not shown) requiring a constant pressure above a predetermined minimum. The chamber 9 is open at its bottom end 11 through the bottom wall 6 at one side of and adjacent the inlet opening of passageway 5. Within the chamber 9 there is a reciprocally operable, substantially cylindrical valve carrying member 12 guided at its upper end portion 13 by an annular enlarged bearing portion 14 having a close fit with the walls of chamber 9. A closure member 15 is screw-threaded, as at 16, into the open chamber end 11 and is sealed around the threads to the wall 6, as by solder 17, to seal the opening. A pin member or post 18 is screw-threaded at its lower end portion into a central aperture through the closure member 15 and extends upward into the chamber 9. The pin member 18 has an upward facing bearing shoulder 19 adjacent member 15 and has at its upper end an enlarged portion or head 20 which forms a bearing or guiding surface received by and slidably fitting an aperture 21 in the lower end 22 of the carrying member 12 to guide and prevent lateral movement of the lower end 22 of member 12 as it reciprocates in the chamber 9. A cylindrical well or recess 23 extends downwardly into the end portion of the member 12 from its upper face 24. Screwthreaded within a central aperture 25 through the bottom wall 26 of the well 23 is a pin member 27 which projects upwardly into the well 23. The upwardly extending end portion of the pin member 27 terminates in a conical or pointed surface 28 having an upwardly projecting apex 29. Secured to the pin member 27 adjacent the base of the surface 28 is an annular, outwardly projecting shoulder portion or flange 30.

A valve head or closure member 31 of inverted cup-shaped form has an end wall providing a valve face from which a cylindrical wall or side flange portion 32 projects downward toward the bottom 26 of the well 23. A conical recess 34 centrally located in the closure member end wall and within the member 31 receives the apex 29 of the conical surface 28. Surrounding the member 27 in laterally spaced relation is an annular abutment or ring member 36 positioned below shoulder portion 30 and secured, as by peening, at its outer marginal edge in an annular groove in the lower open end portion of member 31. A helical coil spring 37 surrounds member 27 and is held under compression between the shoulder portion 30 and the ring member 36 to hold the member 31 tightly to the pin member 27 and in a given position, but free enough to allow the member 31 universal movement. A valve seat member 38 is screw-threaded, as at 39, into the outlet end of the passageway 7 and projects downward from the top wall 8 of chamber 9, defining a valve port 40. The valve closure member 31 cooperates with the seat member 38 to control flow of fluid from the inlet passageway 5 through valve port 40 into the chamber 9, and by its universal mounting acts upon engagement with member 38 to adjust itself automatically to the face of member 38.

A helical coil spring 41, surrounding the pin member 18 and the lower end portion of carrying member 12, has its lower end abutting a plate-like holding member 42 which has a central aperture 43 therethrough, through which aperture the shoulder 19 of the pin member 18 projects. The shoulder 19 of the pin member 18 serves as an abutment for positioning and supporting the holding member 42 relative to the closure member 15, and thereby to regulate the valve closing force of spring 41. The other or upper end of the spring 41 abuts a downwardly facing shoulder 44 of the carrying member 12 and is operable to move the member 12 toward the wall 8 until the valve closure member 31 is against the seat member 38 to stop the flow of fluid from the passageway 5 to the chamber 9.

The body member 2 has a recessed portion 45 in its top wall 46, and an extended portion 47 surrounding the recessed portion 45 which intersects with the body to form an annular shoulder 48 spaced from the bottom of the recessed portion 45. In the body member 2 is a vertically extending passageway 49 leading upward from the chamber 9 and opening through the bottom wall of the recessed portion 45 to form a means of communicating pressure from chamber 9 to a pressure chamber 50 formed by the recessed portion 45 and a pressure responsive closure member 51, such as a diaphragm. The diaphragm 51, shown in detail in Fig. 3, comprises a thin, flexible and resilient, metallic disk 52 and has a plurality of annular corrugations 53, so that the disk responds freely to changes of fluid pressure. The peripheral edge portion of the diaphragm 51 has a marginal flange 54 projecting upwardly and substantially fitting within a portion of the inner surface of the extended portion 47 and overlying the shoulder portion 48. A backing member 55, shown in detail in Fig. 4, preferably in the form of a spider, has a plurality of fingers 56 joining a center disk portion 57 with a ring peripheral portion 58 seating on the shoulder portion 48, and underlies the diaphragm 51 to serve as a protection therefor to prevent shearing when the diaphragm is flexed inward toward the recessed portion 45, and also serves as a carrying member for a plate-like abutting member 59, shown in Fig. 5. The abutting member 59 is secured to the disk portion 57 on the underside of member 55 and is held thereby adjacent to but spaced from the diaphragm 51. The abutting member 59 has its peripheral edge 60 bent slightly downward toward the bottom wall 61 of the recessed portion 45 and away from the diaphragm 51 so that upon movement of the diaphragm outward, under pressure in chamber 50, the edge 60 will be spaced from or conform to the diaphragm and not tend to rupture the diaphragm 51. The cap member 3 has an outward turned or directed marginal annular flange portion 62 which seats on the marginal edge portion of the diaphragm 51 and fits within the flange 54. The surrounding body portion 47 has a top clamping portion 63 which extends above the flange 54 and portion 62 and is bent inward, as by rolling, to clamp the flange portion 62, the member 55, and the diaphragm 51 tightly together and in fluid-tight relation to the top wall shoulder portion 48. The annular space between the bent portion 63 and the side wall of the cap member 3 at the flange portion 62 is preferably filled with solder, as at 64, to reenforce the bent top portion 63 and to hermetically seal the diaphragm 51 to the body member 2 and to the cap member 3 to insure a fluid-tight joint.

The plate-like abutting member 59 overlies and is engageable with an annular boss or rib 65 serving as a stop member and projecting centrally from the bottom wall 61 to limit downward or valve opening movement of the diaphragm 51. Around the boss 65 is a plurality of apertures 65a which extend from the chamber 50 through the bottom wall 61 and through the body member 2 into the chamber 9. A plurality of thrust pins 66 extend downward from the member 59 through the apertures 65a, being guided by the walls of the apertures, and terminate in abutting relation with the top face of the carrying member 12. The thrust pins 66 are operable to transmit motion from the diaphragm 51 to the member 12 and each has within the chamber 9 an annular recess or groove 67. An endless helical coil tension spring 68 is received by and held by tension in the recesses 67 and surrounds the plurality of pins 66 to urge them into frictional engagement with the side walls of their respective apertures 65a. The friction of the pins 66 against their aperture walls serves to prevent valve chatter caused by slight changes of pressure in chamber 50 acting on diaphragm 51.

The cap member 3 has an annular, substantially horizontal portion 69 providing a downward facing internal shoulder to serve as a stop, spaced from the diaphragm 51 and located radially intermediate the flange portion 62 and a concentric, substantially cylindrical portion 70. The cylindrical portion 70 projects upwardly from the horizontal portion 69 to provide a tubular guide, above which it is screw-threaded, as at 71, for reception of an externally threaded, hollow, cylindrical, downwardly projecting portion 72 of the adjusting cap 4. Guided within the cap member portion 70 there is an annular, cup-shaped member 73 having an annular, outwardly extending flange 74 which extends between the diaphragm 51 and the horizontal portion 69 of the cap member 3 to serve as a reenforcing and limiting means for the diaphragm by engagement with the shoulder 69. The cup member 73 has an annular base portion or flange 75 providing a central aperture 76, and has a substantially vertical, cylindrical side wall portion 77 which fits freely within the tubular guide of portion 70 and which joins the base portion 75 and the flange 74. A hollow cylindrical member 78 is located within the member 73, concentric with the base portion 75 and has a lower end wall 79 which seats on or abuts the upper face of the diaphragm 51 and has a vertically extending, cylindrical side wall portion 79a guided for reciprocal movement by the side wall portion 77. When the member 78 has been lifted, due to the pressure within chamber 50 acting on diaphragm 51 so that the upper face or top end of the side wall portion 79ᵃ is abutting the lower adjacent surface of the base portion 75, the bottom surface of member 78 cooperates with the flange 74 to form a slightly concave, downward facing stop surface or abutment. This abutment acts to limit the outward or upward movement of the diaphragm 51 from the bottom wall 61 of the recessed portion 46 to prevent the rupture of the diaphragm 51 upon an excess pressure within the chamber 50.

Extending through the cup member aperture 76 there is a cylindrical member 80 having an upper end wall 81 and having an outwardly extending, annular flange 82 at the bottom end thereof, the member 80 extending longitudinally of the valve 1 with the lower surface of the flange 82 abutting the upper surface of the member 78 within the side wall portion 79. The upper surface of the flange 82 serves as an abutment for a helical coil spring 83 which surrounds and is concentric with the cylindrical member 80. The spring 83 extends upward from the flange 82 through the aperture 76 of the member 73 into the inside of the hollow portion 72 of the cap 4 and abuts against an annular, downward facing flange 84 of an annular abutment member 85. A minimum pressure adjusting member 86, such as a bolt, extending through an aperture 87 through the upper end wall 81 of member 80, is threaded at the upper end and has a flange or head portion at the lower end within the interior of the cylindrical member 80. The head portion is larger than the aperture 87, and the bolt 86 is thereby prevented from being removed through the aperture 87. The abutment member 85 has a central threaded aperture 88 therethrough which receives the threaded portion of the bolt 86. The extreme end of the bolt 86 extends beyond the threaded portion and abutment 85 and is in the shape of a truncated cone 89. The upper end portion of the truncated cone is received within a recess in the upper wall 90 of the hollow cap member 4, concentric with the diaphragm abutting member 78. The spring 83 is held under a predetermined compression force between the flanges 82 and 84 when the head of bolt 86 is in engagement with the upper end wall 81. When the head of bolt 86 is urged by the adjustment cap 4 away from the upper end wall 81, the spring 83 acts in conjunction with the atmospheric pressure admitted through aperture 4ᵃ to urge the diaphragm 51 in a valve opening direction against the pressure within chamber 50. The abutment member 85 is adjustably threaded onto the bolt 86 and is held in position, such as by solder in the threads, as at 91. The adjustment cap 4 which abuts the truncated cone portion of the bolt 86 may be screwed in the threaded portion 71 of the cap member 3 to move the upper wall 90 relative to cap member 3 and thereby move the bolt 86 out of engagement with end wall 81 to change the spring force acting on the diaphragm 51 which adjusts the delivery pressure of the valve 1. The valve 1 may be adjusted to a predetermined minimum pressure, when the bolt head will engage wall 81, and then with any attempt to further reduce the pressure by the adjustment cap 4, the valve will be immediately closed to fluid flow due to the elimination of any resilient force acting on the diaphragm 51 in a valve opening direction, the force of the spring 83 being entirely exerted in holding the head of bolt 86 against the upper end wall 81 of the cylindrical member 80. The engagement of the head of the bolt 86 with the end wall 81 also prevents the spring 83 from excess expansion should adjustment cap 4 be removed from its threaded connection to cap member 3.

The operation of the valve 1 with a given setting of the adjusting cap 4 is as follows: The high pressure inlet fluid which is to be discharged at a reduced pressure is admitted through inlet passageway 8 and the open valve port 40 into chamber 9. From chamber 9 the fluid discharges through outlet passageway 10 under substantially constant pressure, due to automatic throttling of the valve member. The pressure within chamber 9 is transmitted through passageway 49 to the pressure chamber 50 and acts on the flexible diaphragm 51 to urge it outward to permit movement of the valve member toward closed position. Outward movement of the diaphragm 51 is opposed by atmospheric pressure admitted through aperture 4ᵃ and by the expansive force of helical coil spring 83 which is held under stress by the adjusting cap 4. The force of the spring 41 acts, while urging the valve closure member 31 toward closed position, through thrust pins 66 on the diaphragm 51, in conjunction with the pressure in chamber 50, but at valve closed position the force of spring 41 will be taken up so that the pressure in chamber 50 is the only force acting in opposition to the spring 83 and atmospheric pressure. If the pressure in chambers 9 and 50 increases above the pressure to be maintained by the valve, then the fluid pressure will overbalance the force exerted in valve opening movement on the diaphragm 51 so that spring 41 will move valve member 31 toward the valve port 40 to decrease flow of fluid through port 40 until the rate of inlet flow is the same as the rate of flow of the fluid leaving the outlet passageway 10. Should the flow through outlet 10 be sufficiently limited or stopped, then the pressure within chambers 9 and 50 will increase slightly and the valve will move to closed position due to the unbalancing of the forces acting on diaphragm 51. The closure member 31 has universal movement with respect to the valve seat 38 so that as it comes to closed position, it will adjust itself to the face of the seat to insure complete closure and to prevent further flow of fluid into chamber 9. Once the member 31 has automatically adjusted itself to close against the seat 38, further closures should require no movement of member 31 relative to the carrying member 12, but the member 31 remains free to do so should it be necessary.

The valve 1 is set for operation as follows: With the adjusting cap 4 removed, the diaphragm 51 is moved against its inherent resilience from inert position to engage the stop 65, the stop being a predetermined distance from the plane of the diaphragm when the diaphragm is in inert or unflexed position. The carrying member 12 is held against the thrust pins 66 after they have been moved thereby into engagement with the abutting member 59, and the pin member 27 is then screwed in a valve closing direction until the closure member 31 is in valve closed position. The pin member 27 is then screwed in a valve opening direction until the closure member 31 has moved the same distance from the valve seat 38 as the predetermined distance of the stop 65 from the plane of the unflexed diaphragm 51. In this manner I set the maximum opening of the valve port 40 and adjust the closure member 31 so that when the valve is in operation and the valve port 40 is closed to flow of fluid, the diaphragm 51 will be in normal unflexed position. The force exerted by the spring 41 may now be set by screwing the pin member 18 in or out such that the abutment member 42 will act on the spring to hold the valve closed when a given predetermined, subatmospheric pressure is imposed upon chambers 9 and 50. The adjustment cap 4 is removed during all of these operations and the upper surface of the diaphragm 51 is exposed to atmospheric pressure.

The spring 83, cylindrical member 80, abutment member 85 and bolt 86 form a spring assembly and provide an interconnected unit which is preferably removed from and adjusted separately of the valve 1 in a suitable apparatus. The bolt 86 is inserted through the aperture 87 in the member 80, with the bolt head within member 80 and abutting the upper end wall 81. The spring 83 is slipped over the bolt 86 and member 80, concentric therewith, with one end seating on the upper face of the flange 82. The abutment member 85 is then screwed on the bolt 86 compressing the spring 83 until it exerts a predetermined expanding force which is directly related to the minimum pressure for which the valve 1 may be adjusted by the adjusting cap 4. This assembly is then put in place with the flange 82 abutting the member 78, and the adjusting cap 4 is screw-threaded into the cap member 3. The cap 4 is adjusted upon installation so that the valve 1 has the proper discharge pressure which is above the predetermined minimum for which the spring 83 is set. Screwing the adjustment cap 4 toward the body member 2 to compress spring 83 will tend to increase the discharge pressure. Screwing the adjustment cap 4 outward lessens the force of spring 83 and reduces the fluid pressure output of the valve 1. When the valve member 31 is in closed position and the spring 83 is sufficiently expanded, causing the head of the bolt 86 to come into engagement with the end wall 81, the force of the spring 83 is counteracted so that the spring is ineffective to urge the valve member 31 toward open position. Any movement of the abutment member 78 by the spring 83 acting through the flange 82 to urge the member 31 toward open position, is prevented by the engagement of the head of bolt 86 with the wall 81 and the exerted potential force of the spring will merely act to hold the bolt head in tighter engagement with the wall 81. The spring assembly therefore provides an operating means having a potential force which has the reduction of its expansive potential force limited so that any attempt to adjust the valve to maintain a discharge pressure below a minimum desired pressure will result in closure of the valve member.

It is thus seen that I have a pressure responsive, fluid flow valve which may be adjusted from closed position over a range of output pressures below a predetermined minimum pressure. I have also a valve with a novel valve closing member which insures complete and positive closure of the valve to flow of fluid and counteracts the effects of manufacturing tolerance. The valve is simple in construction and easy to manufacture.

What I claim and desire to secure by Letters Patent of the United States is:

1. A valve of the character described, comprising a casing having a passageway therethrough and including a valve port, a valve member operable to control flow of fluid through said port, said casing having a recess in one wall thereof communicating with said passageway, a pressure responsive diaphragm cooperating with said recess to form a pressure chamber, stop means overlying said diaphragm to prevent rupture thereof upon excess pressure in said pressure chamber, a helical coil spring, a cylinder member having an apertured end wall and a flange, said flange being operable to urge said diaphragm in one direction, a bolt having a head end, said bolt extending through said apertured end wall, said spring surrounding said bolt and abutting said cylinder member flange, an abutment member secured to said bolt, said spring being held under compression intermediate said cylinder member flange and said abutment member and operable to hold said head end in engagement with said end wall, and an adjusting cap operable through said abutment member to compress said spring to resiliently urge said flange against said diaphragm and said head end out of engagement with said end wall.

2. A valve of the character described, comprising a casing having a passageway therethrough and including a valve port, a valve member operable to control flow of fluid through said port, said casing having a recess in one wall thereof communicating with said passageway, a pressure responsive diaphragm cooperating with said recess to form a pressure chamber, resilient means, a cylinder member having an apertured end wall and a flange, said flange being operable to urge said diaphragm in one direction, a bolt having a head end, said bolt extending through said apertured end wall, said resilient means abutting said cylinder member flange, an abutment member secured to said bolt, said spring being held under compression intermediate said cylinder member flange and said abutment member and operable to hold said head end in engagement with said end wall, and an adjusting cap operable through said abutment member to compress said resilient means to resiliently urge said flange against said diaphragm and said head end out of engagement with said end wall.

3. A valve of the character described, comprising a casing having a passageway therethrough and including a valve port, a valve carrying member reciprocal to said port, resilient means urging said carrying member toward said port, a closure member universally secured to said carrying member and operable to control the flow of fluid through said port, said casing having a recess in one wall thereof and a passageway leading therefrom to said first-named passageway for the transfer of fluid pressure, a diaphragm cooperating with said recess to form a pressure chamber, a plate member within said recess adjacent said diaphragm, a plurality of thrust pins abutting at one end on said plate member and at the other end on said carrying member and operatively connecting said diaphragm to said closure member for movement in one direction, a cap member overlying said diaphragm, stop means limiting movement of said diaphragm in a second direction away from said casing, a cylinder member having a flange at one end operatively engaging said diaphragm and having an apertured wall at the other end, a bolt extending from said cylinder member through said apertured wall and having a head portion operable to engage said apertured wall to limit movement of said bolt in one direction, a helical coil spring concentric with and surrounding said bolt, an abutment member secured to said bolt, said spring being held under compression between said flange and said abutment member and operable to hold said head portion in engagement with said apertured wall, an adjusting cap adjustably held by said cap member and operable to engage and move said bolt to compress said spring and thereby resiliently urge said diaphragm in said one direction.

4. A valve of the character described, comprising a casing having a passageway therethrough and including a valve port, a holding member resiliently urged toward said valve port, a conical carrying pin rigid with and carried by said holding member and having the apex thereof extending toward said valve port, a cup-shaped valve closure member receiving said conical pin and supported thereby on the apex thereof, means interposed between said pin and said closure member for securing said closure member to said holding member and for movement thereby, and means operable to urge said holding member away from said valve port for flow therethrough.

5. A valve of the character described, comprising a casing having a passageway therethrough and including a valve port, a holding member resiliently urged toward said valve port, a conical carrying pin rigid with and carried by said holding member and having the apex thereof extending toward said valve port, a cup-shaped valve closure member receiving said conical pin and supported thereby on the apex thereof, resilient means interposed between said pin and said closure member for holding said closure member to said holding member and for movement thereby, and pressure responsive means operable to urge said holding member away from said valve port for flow therethrough.

6. A valve of the character described, comprising a casing having a passageway therethrough and including a valve seat having a valve port, a holding member resiliently urged toward said valve port, a pin member adjustably secured to said holding member and having a conical end portion concentric with and projecting toward said port, a shoulder portion secured to said pin member adjacent the base of said conical portion, an inverted cup-shaped member for controlling flow through said port and having a conical recess in the end wall thereof within said cup-shaped member, said recess receiving said conical portion, the edge portion of said cup-shaped member extending beyond said shoulder portion, and resilient means interposed intermediate said shoulder portion and said edge portion and resiliently urging said cup-shaped member to said pin member and securing said cup-shaped member for universal movement relative to said pin member so that said cup-shaped member can adjust itself to the face of said seat.

7. A valve of the character described, comprising a casing having a passageway therethrough and including a valve port, a valve member operable to control flow of fluid through said port, said casing having a recess in one wall thereof communicating with said passageway, a pressure responsive diaphragm cooperating with said recess to form a pressure chamber, a cap member having a shoulder and overlying said diaphragm, a cup-shaped member interposed between said shoulder and said diaphragm, and a cylindrical member disposed within said cup-shaped member, said cup-shaped member and said cylindrical member interengaging with each other and with said shoulder to limit movement of said diaphragm in one direction.

8. A valve of the character described, comprising a casing having a passageway therethrough and including a valve port, a valve member operable to control flow of fluid through said port, said casing having a recess in one wall thereof communicating with said passageway, a pressure responsive diaphragm cooperating with said recess to form a pressure chamber, a cap member overlying said diaphragm and having a shoulder portion spaced from said diaphragm, a cup-shaped member having a base portion and a flange portion said flange portion being intermediate said shoulder portion and said diaphragm, and a cylindrical member interposed between said base portion and said diaphragm, said flange portion and said cylindrical member cooperating to form a substantially concave abutting surface to limit movement of said diaphragm in one direction when said flange portion is in engagement with said shoulder portion and when said cylindrical member is abutting said base portion.

9. A valve of the character described comprising a casing having a passageway therethrough and including a valve port, a valve member operable to control flow of fluid through said port, a pressure responsive diaphragm operable to control said valve member, a helical coil spring, a cylinder member having an apertured end wall, said cylinder member being operable to urge said diaphragm in one direction, a thrust member having an abutment portion, said thrust member extending through said apertured end wall, said spring surrounding said thrust member and abutting said cylinder member, an abutment member secured to said thrust member, said spring being held under compression intermediate said cylinder member and said abutment member and operable to hold said abutment portion in engagement with said end wall, and an adjusting cap operable through said abutment member to compress said spring to resiliently urge said cylinder member against said diaphragm and said abutment portion out of engagement with said end wall.

10. A valve of the character described comprising a casing having a passageway therethrough and including a valve port, a valve member operable to control flow of fluid through said port, a pressure responsive diaphragm operable to control said valve member, a helical coil spring, a cylinder member having an apertured end wall and an outwardly extending circumferential flange, said flange being operable to urge said diaphragm in one direction, a rod having an abutment portion, said rod extending through said apertured end wall, said spring surrounding said rod and abutting said cylinder member flange, an abutment member secured to said rod, said spring being held under compression intermediate said cylinder member flange and said abutment member and operable to hold said abutment portion in engagement with said end wall, and an adjusting cap operable through said abutment member to compress said spring to resiliently urge said flange against said diaphragm and said abutment portion out of engagement with said end wall.

11. A valve of the character described comprising a casing having a passageway therethrough and including a valve port, a valve member operable to control flow of fluid through said port, said casing having a recess in one wall thereof communicating with said passageway, a pressure responsive diaphragm cooperating with said recess to form a pressure chamber, a cap member overlying said diaphragm and having a shoulder portion spaced from said diaphragm, an inverted cup-shaped member having a base portion and a continuous outwardly extending flange portion adjacent its open end, said flange portion being intermediate said shoulder portion and said diaphragm, a hollow cylindrical member interposed within said cup-shaped member and between said base portion and said diaphragm and having an end wall operable to abut said diaphragm, said base portion having an aperture therethrough in substantial alignment with said cylindrical member, and thrust means extending through said aperture into said cylindrical member and abutting said end wall, said flange portion and said cylindrical member cooperating upon movement of said diaphragm in one direction to form a substantially concave abutting surface to limit movement of said diaphragm in said one direction when said flange portion is in engagement with said shoulder portion and when said cylindrical member is abutting said base portion.

DANIEL D. WILE.